US012658768B2

(12) United States Patent
Jiang et al.

(10) Patent No.: US 12,658,768 B2
(45) Date of Patent: Jun. 16, 2026

(54) INTEGRATED DRIVE DEVICE

(71) Applicant: NINGBO SUNFREE MOTOR TECHNOLOGY COMPANY LIMITED, Ningbo City (CN)

(72) Inventors: Chun Jiang, Ningbo City (CN); Baoguo Tan, Ningbo City (CN)

(73) Assignee: NINGBO SUNFREE MOTOR TECHNOLOGY COMPANY LIMITED, Ningbo City (CN)

( * ) Notice: Subject to any disclaimer, the term of this patent is extended or adjusted under 35 U.S.C. 154(b) by 324 days.

(21) Appl. No.: 18/239,789

(22) Filed: Aug. 30, 2023

(65) Prior Publication Data

US 2024/0097534 A1 Mar. 21, 2024

(30) Foreign Application Priority Data

Sep. 15, 2022 (CN) .......................... 202222460955.8

(51) Int. Cl.
H02K 11/33 (2016.01)
H02K 11/215 (2016.01)

(52) U.S. Cl.
CPC ........... H02K 11/33 (2016.01); H02K 11/215 (2016.01)

(58) Field of Classification Search
CPC ........ H02K 11/215; H02K 5/225; H02K 5/24; H02K 5/22; H02K 11/30; H02K 11/33; H02K 11/0094; H02K 7/116; H02K 5/08
(Continued)

(56) References Cited

U.S. PATENT DOCUMENTS

2017/0130528 A1 5/2017 Anthony et al.
2018/0298682 A1 10/2018 Huang
(Continued)

FOREIGN PATENT DOCUMENTS

CN 203383707 U 1/2014
CN 210408040 U 4/2020
(Continued)

OTHER PUBLICATIONS

Jiang et al, An Intelligent Drive Device and An Electric Window Curtain, Jun. 7, 2021, DE 202021103067 (English Machine Translation) (Year: 2021).*
(Continued)

*Primary Examiner* — Alexander A Singh
(74) *Attorney, Agent, or Firm* — Juan Carlos A. Marquez; Marquez IP Law Office, PLLC

(57) ABSTRACT

An integrated drive device is provided which comprises a motor component and a power source component; the motor component is provided with an opposed first end and second end; the first end of the motor component is a power output end; the power source component is detachably and electrically connected with the second end of the motor component; the power source component and the motor component are disposed back and forth in parallel. The integrated drive device as a finished product has a more integrated structure and can be quickly mounted onto and dismounted from a top track of a curtain, saving time and labor in assembling process. The drive device can be adapted to a single-chamber top track of a curtain as well as short and long curtains, and the power source component is detachable, which helps transportation and storage, avoiding occurrence of potential safety hazards.

7 Claims, 7 Drawing Sheets

(58) Field of Classification Search
USPC ................................................. 310/68 R, 71
See application file for complete search history.

(56)                    References Cited

U.S. PATENT DOCUMENTS

| 2021/0363822 A1* | 11/2021 | Blair | .................. H02K 11/0094 |
| 2023/0024688 A1* | 1/2023 | Tan | ........................... E06B 9/42 |

FOREIGN PATENT DOCUMENTS

| CN | 210578089 U | * | 5/2020 | | |
| CN | 212249785 U | | 12/2020 | | |
| CN | 213610501 | * | 7/2021 | | |
| CN | 214855936 U | | 11/2021 | | |
| CN | 216724095 U | | 6/2022 | | |
| CN | 217285398 U | | 8/2022 | | |
| DE | 202021103067 U1 | * | 6/2021 | ............... | E06B 9/42 |

OTHER PUBLICATIONS

Wei et al, Tubular Drive Device with Detachable Power Supply, 2021-0709, CN 213640501 (English Machine Translation) (Year: 2021).*

Guo Hai-Dong, A Mute Damping of the Motor of the Curtain, May 19, 2020, CN 210578089 (English Machine Translation) (Year: 2020).*

PCT International Search Report mailed Jun. 5, 2023 in corresponding PCT application PCT/CN2022/144396, 5 pages in Chinese.

* cited by examiner

INTEGRATED DRIVE DEVICE

This application is based upon and claims priority to Chinese Patent Application No. 202222460955.8, filed on Sep. 15, 2022, the entire contents of which are incorporated herein by reference.

TECHNICAL FIELD

The present disclosure relates to the technical field of electric curtain drive devices and in particular to an integrated drive device.

BACKGROUND

Along with scientific and technological developments, more and more intelligent furniture come into the lives of people. Electric curtains as a representative of intelligent furniture bring much convenience to people.

The electric curtains are electrically controlled to open and close. Now, there are a variety of electric curtains on the market, such as electric venetian blinds, honeycomb blinds and pleated blinds. A drive assembly drives a rope winding assembly to electrically control the curtains to open and close. The drive assembly mainly comprises a motor component, a power source component and a control component. The motor component is used to output power to drive the rope winding assembly to work, the power source component is used to supply power, and the control component is used to control the motor component to work. In most of the existing electric curtains, its motor component, power source component and control component are three independent components which are not integrated together into one integral structure. For example, the motor component is usually mounted into a top track of the curtain, the control component is mounted outside the top track and the power source component is hung outside the top track. Therefore, the motor component, the power source component and the control component are separately assembled and electrically connected with each other by wire welding, bringing inconveniences to quick assembly and disassembly. Further, potential safety hazard is present in the power sources during transportation of the assembled curtains.

In some electric curtains, the motor component, the power source component and the control component are integrated into one-piece structure as a finished drive device, such as tubular motor. In the tubular motor, the motor component, the control component and the power source component are linearly distributed, and thus, the finished drive device has a larger length and occupies a larger space when mounted to the top track of the curtain, hence extending the entire length of the curtain. Therefore, it is not suitable for short curtains. For example, in a U-structured drive device, the motor component and the power source component are disposed up and down in parallel, which obviously shortens the length of the drive device but increases the height which is equal to a sum of the heights of the motor component and the power source component. In this case, the height of the top track of the curtain matching the drive device is also increased. Thus, the manufacturing costs of the top track are greatly increased.

In conclusion, it is urgent to find a method of integrating a motor component, a power source component and a control component into one integral structure to facilitate quick mounting and dismounting without increasing length or height.

SUMMARY

For the above current situation of the prior arts, the technical problem to be solved by the present disclosure is to provide an integrated drive device which has a short length and a medium height and is easy to quickly mount and dismount.

The technical solution adopted by the present disclosure to solve the above technical problem is provided as follows: there is provided an integrated drive device, which comprises a motor component and a power source component. Opposed first end and second end are disposed on the motor component. The first end of the motor component is a power output end. The power source component is detachably and electrically connected with the second end of the motor component. The power source component and the motor component are disposed back and forth in parallel.

Furthermore, an input interface is disposed in an exposed manner on the second end of the motor component and an output interface is disposed in an exposed manner on the power source component. The output interface supplies power to the input interface through insertion connection.

Furthermore, the drive device further comprises a control component. The control component comprises a master control circuit board disposed inside the power source component. A power source in electrical connection with the master control circuit board is disposed inside the power source component. The output interface is disposed close to the second end of the motor component on the master control circuit board.

Furthermore, a motor core and a speed reducer are disposed inside the motor component, where the motor core and the speed reducer are in transmission cooperation and fixedly connected with each other. The speed reducer is close to the first end of the motor component and the motor core is close to the second end of the motor component. An end of the motor core away from the speed reducer is provided with a Hall plate and a signal magnet. A Hall sensor for sensing the signal magnet is disposed on the Hall plate. A transitional circuit board in electrical connection with the Hall plate is disposed inside the second end of the motor component. The input interface is disposed on the transitional circuit board.

Furthermore, a first vibration damping sleeve is sleeved on an end of the speed reducer away from the motor core, and a second vibration damping sleeve is sleeved on an end of the motor core away from the speed reducer.

Furthermore, a filling block is disposed at an end of the motor core away from the speed reducer in the motor component. The filling block is abutted against the second vibration damping sleeve to fill a vacant space from the motor core to the second end of the motor component.

Furthermore, at least one first magnet block and/or first iron block is disposed at the second end of the motor component, and a second magnet block and/or second iron block cooperating with the first magnet block and/or first iron block in a magnetic attraction way is disposed at an end of the power source component docking with the motor component.

Furthermore, at least one catch is disposed on an outer wall of the motor component.

Furthermore, at least one slide block is disposed on a back surface of the power source component.

Compared with the prior arts, the present disclosure has the following advantages: in the present disclosure, the integrated drive device as a finished product has a more integrated structure and can be quickly mounted onto and dismounted from a top track of a curtain, saving time and labor in assembling process. Furthermore, the parallel disposal of the power source component and the motor component back and forth shortens the entire length, which is only a length of the power source component or the motor component, and further, does not increase a height which is only a height of the motor component or the power source component. Therefore, the drive device can be adapted to a single-chamber top track of a curtain as well as short and long curtains. Moreover, the power source component is detachable, which helps transportation and storage, avoiding occurrence of potential safety hazards.

BRIEF DESCRIPTION OF THE DRAWINGS

In order to describe the embodiments of the present invention or the technical solution of the prior art more clearly, brief descriptions will be made below to the accompanying drawings involved in descriptions of the embodiments or the prior art. Obviously, the accompanying drawings are merely illustrative, and other drawings may also be obtained by those skilled in the art based on these drawings without paying creative work.

The structures, scales, sizes and the like depicted in the specification are only used by those skilled in the art to know and read the contents disclosed by the specification rather than to limit the embodiments of the present disclosure. Therefore, the structures, scales, sizes and the like do not have technically substantive meanings. Any modification, changes or adjustment to the structures, the scales and sizes shall all fall within the scope of protection covered by the technical contents disclosed by the present invention without affecting the effects and the purposes achieved by the present invention.

Figure 1:
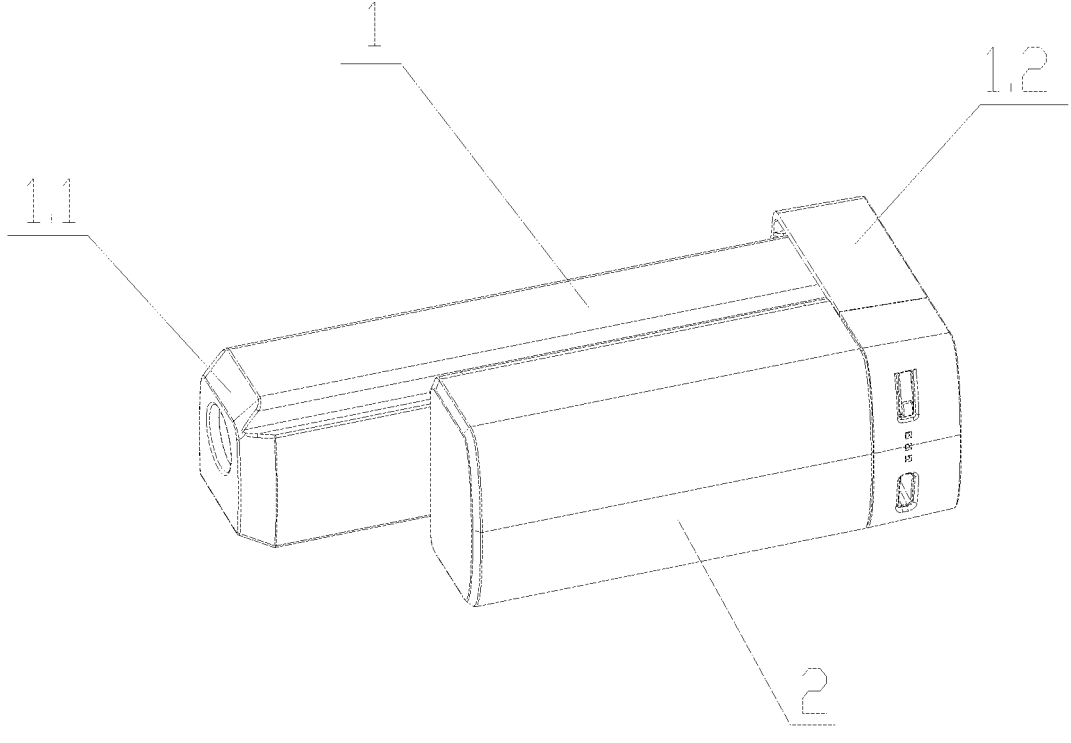
FIG. 1 is a structural schematic diagram of the present disclosure.

The numerals of the drawings are described below: 1. motor component, 1.1 first end, 1.2 second end, 1.3 input interface, 1.4 catch, 1.5 motor core, 1.6 speed reducer, 1.7 Hall plate, 1.8 signal magnet, 1.9 Hall sensor, 1.10 first magnet block/first iron block, 1.11 transitional circuit board, 1.12 first vibration damping sleeve, 1.13 second vibration damping sleeve, 1.14 filling block, 2. power source component, 2.1 power source, 2.2 slide block, 2.3 second magnet block/second iron block, 3. control component, 3.1 master control circuit board, 3.2 output interface.

DETAILED DESCRIPTIONS OF EMBODIMENTS

The present invention will be further detailed below in combination with specific embodiments.

In the descriptions of the present invention, it is understood that orientation or positional relationship indicated by the terms such as "central", "longitudinal", "transverse", "length", "width", "thickness", "upper", "lower", "front", "rear", "left", "right", "vertical", "horizontal", "top", "bottom", "inside", "outside", "clockwise" "counterclockwise" "axial", "radial", and "circumferential" is used only for ease of descriptions and simplification of descriptions and does not indicate or imply that the indicated devices or elements must have a particular orientation, or be constructed or operated in a particular orientation. Therefore, such terms shall not be understood as limiting of the present invention.

Further, the terms "first" and "second" are used for descriptions only and shall not be understood as indicating or implying relative importance or implicitly indicating the number of the indicated features. As a result, the features defined by "first" and "second" may explicitly or implicitly include at least one feature. In the descriptions of the present invention, the meaning of "several" refers to at least two, for example, two or three or the like, unless otherwise clearly stated.

In the present invention, unless otherwise clearly stated or defined, the terms "mount", "connect", "couple", and "fix" and the like shall be understood in a broad sense, for example, may be fixed connection, or detachable connection, or formed into one piece; or may be mechanical connection, or electrical connection; or direct connection or indirect connection through an intermediate medium, or may be internal communication between two elements or mutual interaction of two elements, unless otherwise stated. Those skilled in the art may understand the specific meanings of the above terms in the present invention according to actual situations.

In the present invention, unless otherwise clearly stated or defined, the first feature being "on" or "below" the second feature refers to that the first feature and the second feature are in direct contact, or the first feature and the second feature are in indirect contact through an intermediate medium. Furthermore, the first feature being "above" or "on" the second feature refers to that the first feature is exactly above or obliquely above the second feature, or only refers to that the first feature has a higher horizontal height than the second feature. The first feature being "under" or "below" the second feature refers to that the first feature is exactly under or obliquely below the second feature, or only refers to that the first feature has a smaller horizontal height than the second feature.

As shown in FIGS. 1 to 7, the present disclosure provides an integrated drive device, which comprises a motor component 1 and a power source component 2. Opposed first end 1.1 and second end 1.2 are disposed on the motor component 1. The first end 1.1 of the motor component 1 is a power output end connected, in a transmission manner, with a rope winding assembly disposed inside a top track of a curtain to drive the rope winding assembly to take up and release a pull rope, so as to electrically control the curtain to open and close. The power source component 2 is detachably and electrically connected with the second end 1.2 of the motor component 1. The power source component 2 and the motor component 1 are disposed back and forth in parallel. The motor component 1 can be quickly inserted into the top track of the curtain, and the power source component 2 can be slidably connected outside the top track of the curtain, without occupying the internal mounting space of the top track.

In the present disclosure, the integrated drive device as a finished product has a more integrated structure and can be quickly mounted onto and dismounted from the top track of the curtain, saving time and labor in assembling process. Furthermore, the parallel disposal of the power source component 2 and the motor component 1 back and forth shortens the entire length, which is only a length of the power source component 2 or the motor component 1, and further, does not increase a height which is only a height of the motor component 1 or the power source component 2. Therefore, the drive device can be adapted to a single-chamber top track of a curtain without needing to increase the height of the top track and hence reducing the costs. Further, the drive device is also adapted to short and long curtains, i.e. can be mounted onto small and large windows. Moreover, the power source component 2 is detachable, which not only facilitates charge and maintenance but also helps transportation and storage, avoiding occurrence of potential safety hazards.

Figure 2:
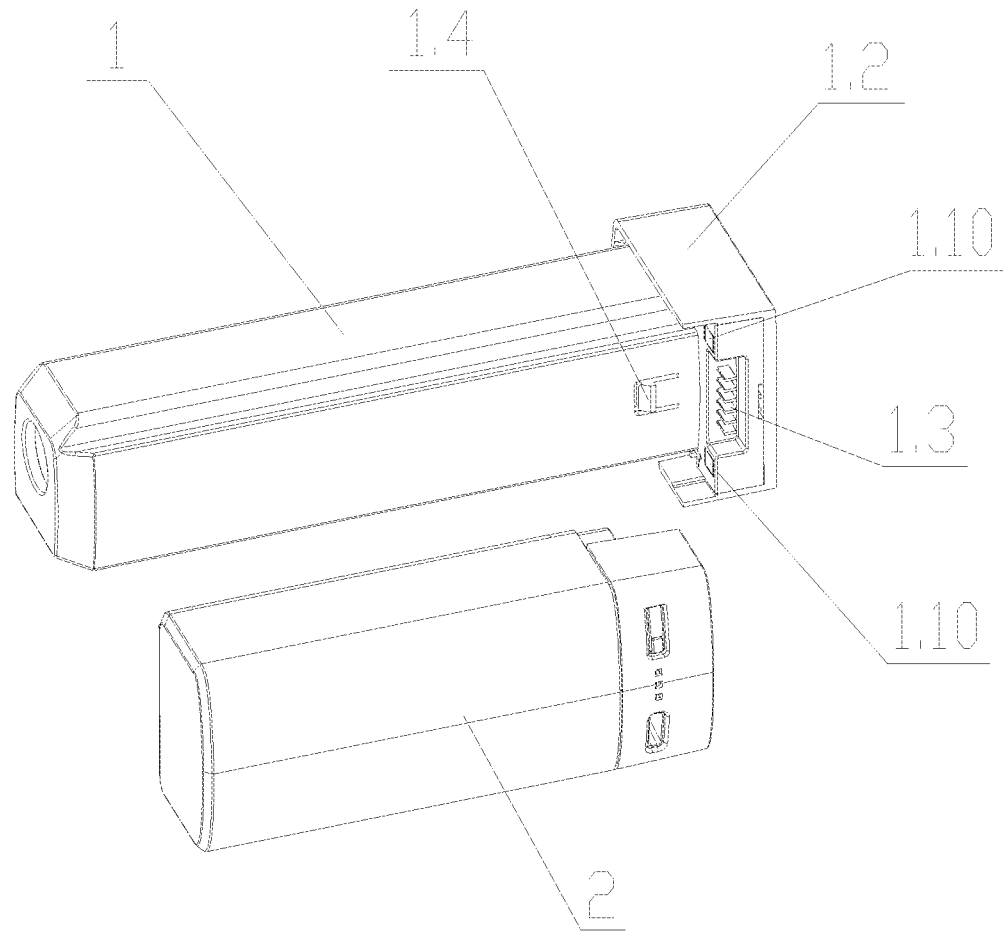
FIG. 2 is a structural schematic diagram of a motor component and a power source component separated from each other according to the present disclosure.
Figure 3:
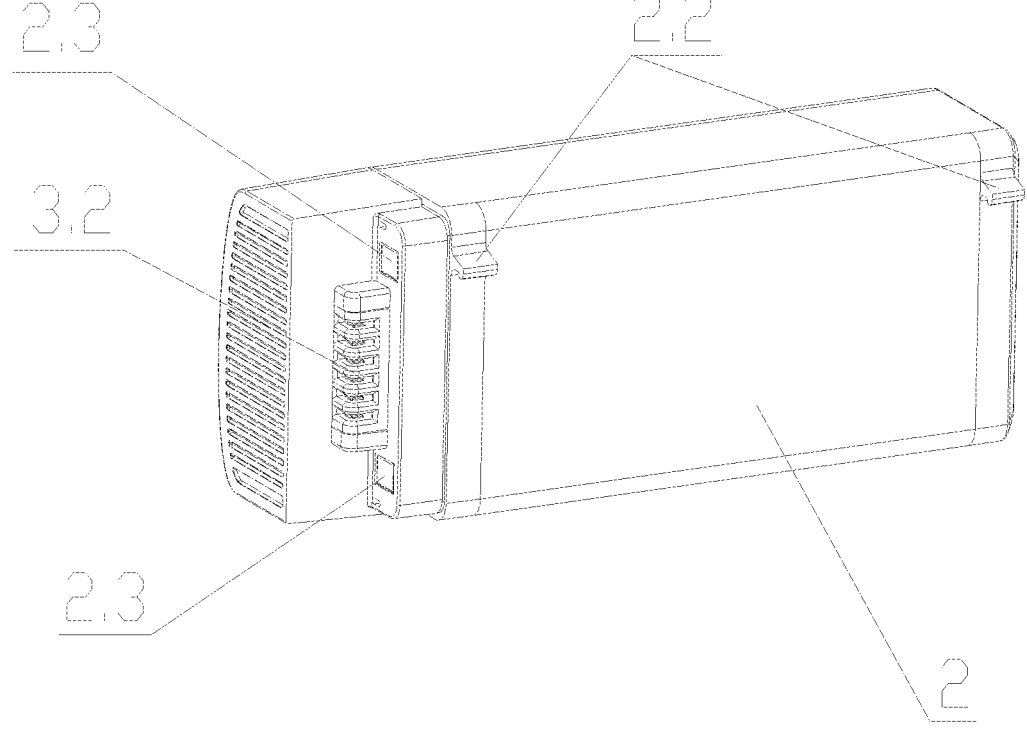
FIG. 3 is a structural schematic diagram illustrating a power source component according to the present disclosure.

By referring to FIGS. 2 and 3, an input interface 1.3 is disposed in an exposed manner on the second end 1.2 of the motor component 1 and an output interface 3.2 is disposed in an exposed manner on the power source component 2. The output interface 3.2 supplies power to the input interface 1.3 through insertion connection. Compared with electric wire welding, the structural disposal facilitates dismounting and achieves repeated insertion, so as to realize power supply and communication.

Figure 4:
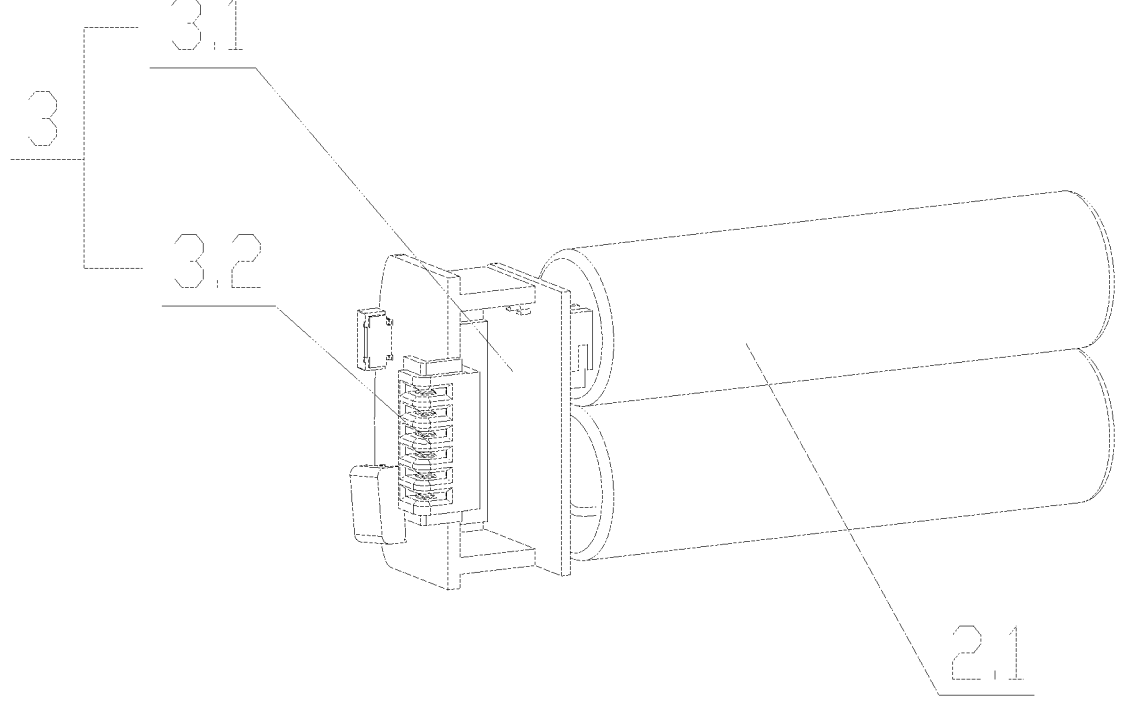
FIG. 4 is a structural schematic diagram illustrating a power source component without a housing according to the present disclosure.

With reference to FIG. 4, the drive device further comprises a control component 3. The control component 3 is used to control the motor component 1 to work, the power source component 2 is used to supply power, and the motor component 1 is used to output power. The control component 3 comprises a master control circuit board 3.1 disposed inside the power source component 2. A power source 2.1 in electrical connection with the master control circuit board 3.1 is disposed inside the power source component 2. The output interface 3.2 is disposed close to the second end 1.2 of the motor component 1 on the master control circuit board 3.1.

Figure 5:
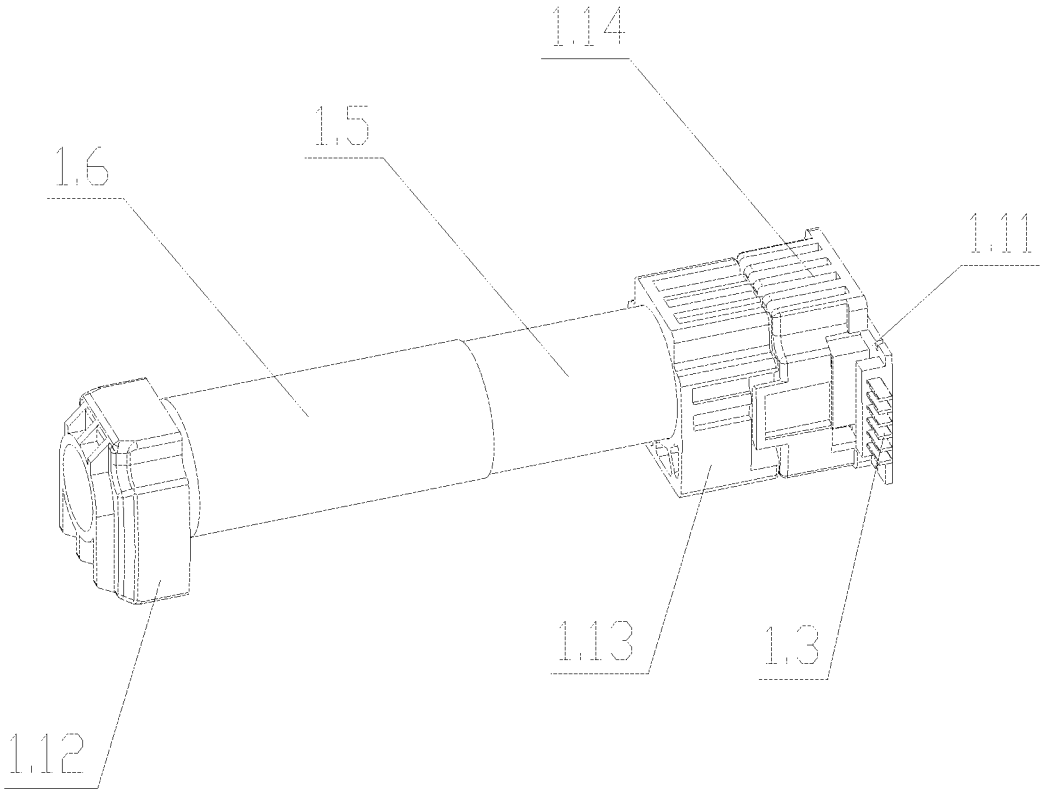
FIG. 5 is a structural schematic diagram illustrating a motor component without a housing according to the present disclosure.
Figure 6:
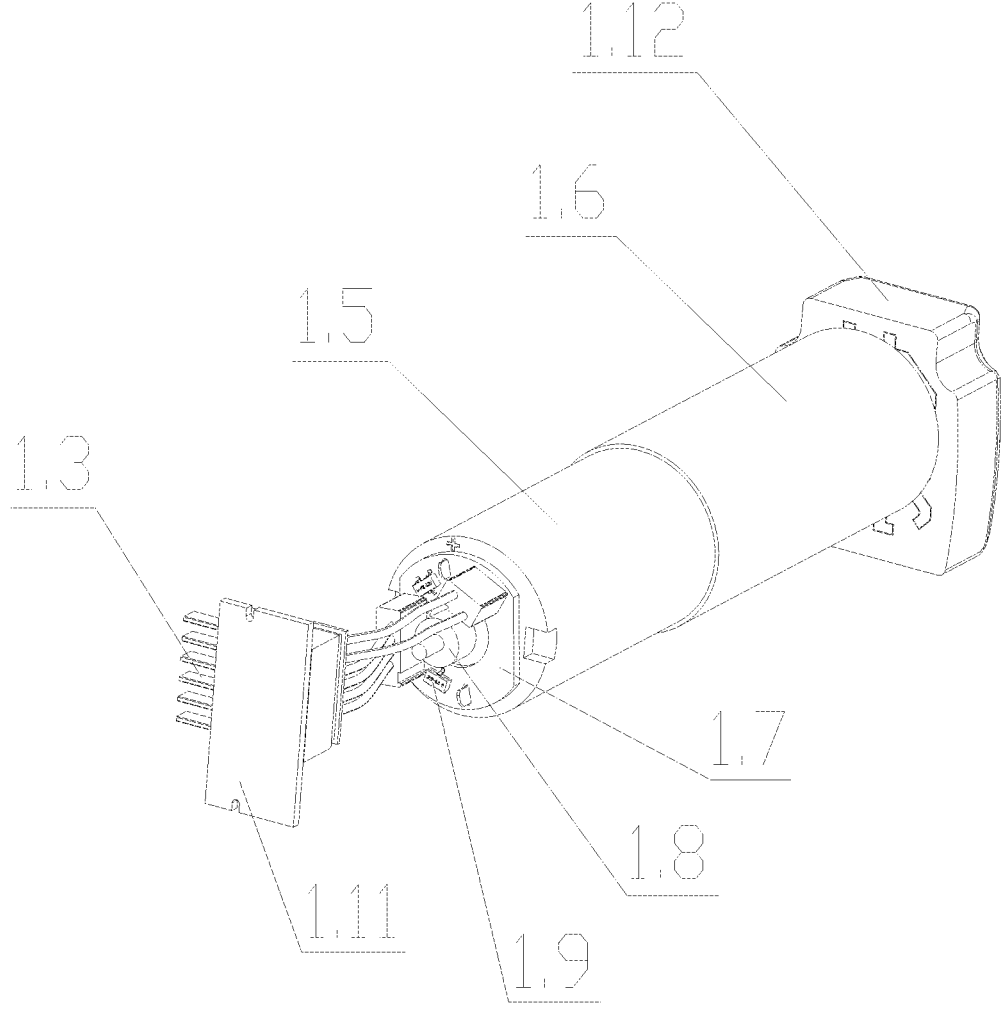
FIG. 6 is a schematic diagram illustrating connection of a Hall plate and a transitional circuit board in a motor component according to the present disclosure.
Figure 7:
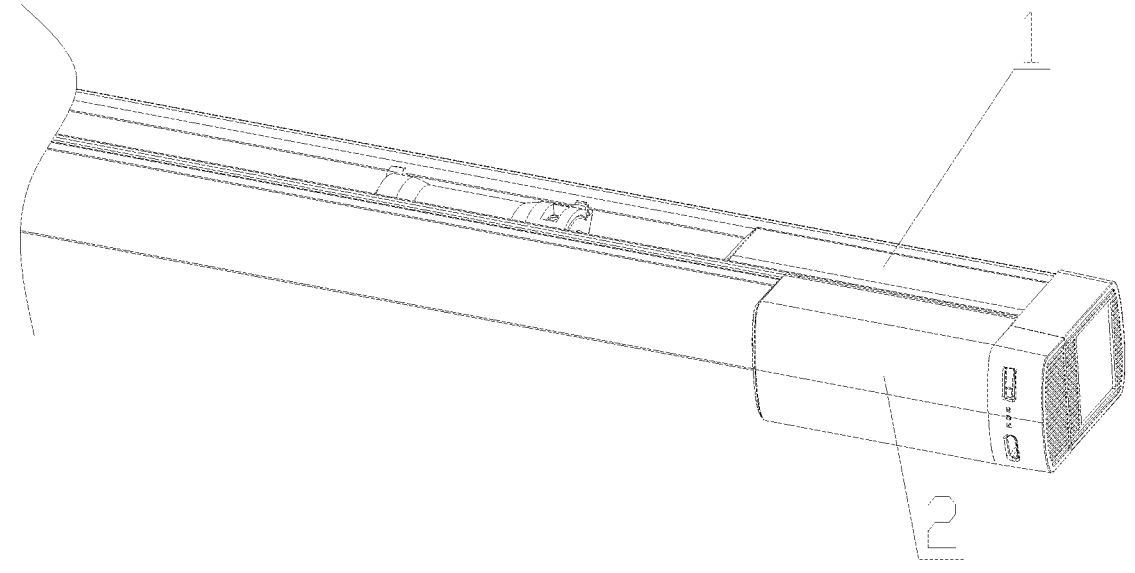
FIG. 7 is a schematic diagram illustrating insertion assembling of a top track of a curtain according to the present disclosure.

With reference to FIGS. 5 and 6, a motor core 1.5 and a speed reducer 1.6 are disposed inside the motor component 1, where the motor core 1.5 and the speed reducer 1.6 are in transmission cooperation and fixedly connected with each other. The speed reducer 1.6 is close to the first end 1.1 of the motor component 1 and the motor core 1.5 is close to the second end 1.2 of the motor component 1. An output end of the motor core 1.5 is connected to an input end of the speed reducer 1.6, and an output end of the speed reducer 1.6 is connected to the rope winding assembly. An end of the motor core 1.5 away from the speed reducer 1.6 is provided with a Hall plate 1.7 and a signal magnet 1.8. The Hall plate 1.7 is electrically connected to the motor core 1.5. A Hall sensor 1.9 for sensing the signal magnet 1.8 is disposed on the Hall plate 1.7. The signal magnet 1.8 and the output end of the motor core 1.5 rotate coaxially. The Hall sensor 1.9 senses a number of turns that the motor core 1.5 rotates by sensing the rotation of the signal magnet 1.8. A transitional circuit board 1.11 in electrical connection with the Hall plate 1.7 is disposed inside the second end 1.2 of the motor component 1. The input interface 1.3 is disposed on the transitional circuit board 1.11. The disposal of the transitional circuit board 1.11 facilitates detachable and electrical connection of the power source component 2. When the master control circuit board 3.1 in the power source component 2 is to be electrically connected to the Hall plate 1.7 for power supply and communication, since the power source component 2 and the motor component 1 are disposed back and forth in parallel and the Hall plate 1.7 is disposed at a tail portion of the motor core 1.5 inside the motor component 1, it is inconvenient to connect the power source component 2 with the Hall plate 1.7. In this case, by using the transitional circuit board 1.11 as a transition, the input interface 1.3 is disposed in an exposed manner on an end of the second end 1.2 to help connection with the output interface 3.2, thus achieving power supply and communication as well as simple dismounting and mounting.

With reference to FIG. 5, a first vibration damping sleeve 1.12 is sleeved on an end of the speed reducer 1.6 away from the motor core 1.5, and a second vibration damping sleeve 1.13 is sleeved on an end of the motor core 1.5 away from the speed reducer 1.6. The first vibration damping sleeve 1.12 and the second vibration damping sleeve 1.13 may be an annular structure or a semicircular structure or a larger semicircular structure to prevent the motor core 1.5 and the speed reducer 1.6 from being in direct contact with a housing of the motor component 1, changing the original hard connection to a soft connection. The hard connection refers to that the motor core 1.5 and the speed reducer 1.6 are directly fixed inside the housing of the motor component 1, and the soft connection refers to that the motor core 1.5 and the speed reducer 1.6 are fixed in the housing of the motor component 1 through the first vibration damping sleeve 1.12 and the second vibration damping sleeve 1.13. The first vibration damping sleeve 1.12 and the second vibration damping sleeve 1.13 can filter and absorb vibrations generated by the motor core 1.5 and the speed reducer 1.6 and reduce vibration transmission from the motor core 1.5 and the speed reducer 1.6 to the housing of the motor component 1, thereby achieving the effect of vibration damping and noise reduction. The first vibration damping sleeve 1.12 and the second vibration damping sleeve 1.13 are made from a flexible material, for example, may be silicon rubber vibration damping sleeves.

As shown in FIG. 5, a filling block 1.14 is disposed at an end of the motor core 1.5 away from the speed reducer 1.6 in the motor component 1. The filling block 1.14 is abutted against the second vibration damping sleeve 1.13 to fill a vacant space from the motor core 1.5 to the second end 1.2 of the motor component 1. In this way, the motor core 1.5 and the speed reducer 1.6 can be better limited axially to prevent the axial endplay of the motor core 1.5 and the speed reducer 1.6.

With reference to FIGS. 2 and 3, at least one first magnet block and/or first iron block 1.10 is disposed at the second end 1.2 of the motor component 1, and a second magnet block and/or second iron block 2.3 cooperating with the first magnet block and/or first iron block 1.10 in a magnetic attraction way is disposed at an end of the power source component 2 docking with the motor component 1. The structure disposal can further achieve the fixing effect to ensure the power source component 2 is in stable connection with the motor component 1. The stable connection between the output interface 3.2 and the input interface 1.3 during operation can avoid shorter service life resulting from damage to the interfaces due to reasons such as vibration. Furthermore, the magnetic attraction structure facilitates quick mounting and dismounting with less labor and time. Compared with screw fixing, the magnetic attraction structure eliminates the need of tightening screws with an auxiliary tool, solves the problem of screw loss and reduces the number of parts to be assembled, realizing simple and easy mounting and dismounting.

With reference to FIG. 2, at least one catch 1.4 is disposed on an outer wall of the motor component 1, where the catch 1.4 is used to connect with the top track of the curtain to achieve clamping effect and limit the motor component 1 from movement of the motor component 1 along a length direction of the top track of the curtain.

With reference to FIG. 3, at least one slide block 2.2 is disposed on a back surface of the power source component 2. The slide block 2.2 can connect in a sliding way with a slide groove on an outer surface of the top track of the curtain, which, on one hand, facilitates connection and disconnection and on the other hand, achieves vertical supporting for the power source component 2. Preferably, there is one slide block 2.2 which is disposed at a position which is on the back surface of the power source component 2 and away from the second end 1.2 of the motor component 1. Preferably, there are two slide blocks 2.2 which are disposed symmetrically on the back surface of the power source component 2.

Furthermore, the master control circuit board 3.1 used in the present disclosure is a microcontroller unit (MCU) board which is disposed inside the power source component 2. The MCU board is exposed outside the top track of the curtain together with the power source component 2. Since the top track of the curtain is mostly made of a metal material, for example, an aluminum profile, the metallic top track of the curtain can shield remote control signals while a housing of the power source component 2 is made of plastic which cannot shield remote control signals. Therefore, the MCU board exposed outside the top track of the curtain can better receive remote control signals. The MCU board is provided with an indicator lamp, a setting key and a data interface, and windows in one-to-one correspondence with the indicator lamp, the setting key and the data interface are disposed on the housing of the power source component 2. The data interface may be a USB interface for charging or plugging or data communication, the setting key is used for code matching, direction change and factory setting restoration, and the indicator lamp is used to display a working state. The MCU board is further provided with an antenna or on-board antenna to receive external signals. The power source 2.1 in the present disclosure may be a lithium battery, a dry cell or a switching power source.

Furthermore, it is to be noted that, the housings of the motor component 1 and the power source component 2 both are made of plastic. The housing of the motor component 1 fully wraps all parts in the motor component 1, with only the power output end and the input interface 1.3 exposed. The housing of the power source component 2 fully wraps all parts in the power source component 2, with only the output interface 3.2 exposed. When the power source component 2 and the motor component 1 are connected, the output interface 3.2 is connected with the input interface 1.3 in an insertion manner. Thus, only the power output end of the entire drive device is exposed so as to protect the device against dusts and short-circuiting. The housings of the motor component 1 and the power source component 2 fully isolate the parts in the motor component 1 and the power source component 2 from the outside, achieving tidy and aesthetic entire structure as shown in FIGS. 1, 2 and 3.

The materials, reagents and experimental apparatuses involved in the present disclosure all are commercially available products in electric curtain field unless otherwise stated.

Finally, it should be noted that the above embodiments are used only to describe the technical solution of the present disclosure rather than to limit the present disclosure. Although detailed descriptions are made to the present disclosure by referring to the preceding embodiments, those skilled in the art should understand that modifications can be made to the technical solutions recorded in the above embodiments or equivalent substitutions can be made to partial technical features therein. These modifications or substitutions will not cause the essence of the corresponding technical solutions to depart from the spirit and scope of the technical solutions of the embodiments of the present disclosure.

The invention claimed is:

1. An integrated drive device, wherein the device comprises a motor component and a power source component; the motor component is provided with an opposed first end and second end; the first end of the motor component is a power output end; the power source component is detachably and electrically connected with the second end of the motor component; the power source component and the motor component are disposed back and forth in parallel, wherein an input interface is disposed in an exposed manner on the second end of the motor component and an output interface is disposed in an exposed manner on the power source component; the output interface supplies power to the input interface through insertion connection, and a motor core and a speed reducer are disposed inside the motor component, and the motor core and the speed reducer are in transmission cooperation and fixedly connected with each other; the speed reducer is close to the first end of the motor component and the motor core is close to the second end of the motor component; an end of the motor core away from the speed reducer is provided with a Hall plate and a signal magnet; a Hall sensor for sensing the signal magnet is disposed on the Hall plate; a transitional circuit board in electrical connection with the Hall plate is disposed inside the second end of the motor component; the input interface is disposed on the transitional circuit board.

2. The integrated drive device of claim 1, wherein the drive device further comprises a control component; the control component comprises a master control circuit board disposed inside the power source component; a power source in electrical connection with the master control circuit board is disposed inside the power source component; the output interface is disposed close to the second end of the motor component on the master control circuit board.

3. The integrated drive device of claim 1, wherein a first vibration damping sleeve is sleeved on an end of the speed reducer away from the motor core, and a second vibration damping sleeve is sleeved on an end of the motor core away from the speed reducer.

4. The integrated drive device of claim 3, wherein a filling block is disposed at an end of the motor core away from the speed reducer in the motor component; the filling block is abutted against the second vibration damping sleeve to fill a vacant space from the motor core to the second end of the motor component.

5. The integrated drive device of claim 1, wherein at least one first magnet block and/or first iron block is disposed at the second end of the motor component, and a second magnet block and/or second iron block cooperating with the first magnet block and/or first iron block in a magnetic attraction way is disposed at an end of the power source component docking with the motor component.

6. The integrated drive device of claim 1, wherein at least one catch is disposed on an outer wall of the motor component.

7. The integrated drive device of claim 1, wherein at least one slide block is disposed on a back surface of the power source component.

\* \* \* \* \*